(12) United States Patent
Akita

(10) Patent No.: US 6,571,160 B2
(45) Date of Patent: May 27, 2003

(54) REAR-WHEEL STEERING ANGLE CONTROL DEVICE

(75) Inventor: Tokihiko Akita, Nagoya (JP)

(73) Assignee: Aisin Seiki Kabushiki Kaisha, Aichi-Ken (JP)

(*) Notice: Subject to any disclaimer, the term of this patent is extended or adjusted under 35 U.S.C. 154(b) by 0 days.

(21) Appl. No.: 09/924,843

(22) Filed: Aug. 9, 2001

(65) Prior Publication Data

US 2002/0022916 A1 Feb. 21, 2002

(30) Foreign Application Priority Data

May 26, 2000 (JP) ........................ 2000-156953

(51) Int. Cl.[7] .............................. B62D 6/00; B62D 5/06
(52) U.S. Cl. .................... 701/42; 701/70; 280/5.51; 280/211; 280/263; 280/426; 280/99; 180/408; 180/234; 180/140
(58) Field of Search ........................ 701/42, 41, 70, 701/132, 48; 280/91, 99, 5.21, 211, 263, 426, 442; 180/142, 140, 141, 143, 421, 422, 408, 234, 791, 168; 303/122, 146, 140

(56) References Cited

U.S. PATENT DOCUMENTS

| | | | | |
|---|---|---|---|---|
| 4,666,013 A | * | 5/1987 | Shibahata et al. | 180/141 |
| 4,705,131 A | * | 11/1987 | Shibahata et al. | 180/140 |
| 5,003,480 A | * | 3/1991 | Mori et al. | 280/91 |
| 5,010,488 A | * | 4/1991 | Ohshita et al. | 280/91 |

FOREIGN PATENT DOCUMENTS

| | | | |
|---|---|---|---|
| DE | 3905811 A | * | 9/1989 |
| DE | 3917386 A | * | 12/1990 |
| JP | 402182580 A | * | 7/1990 |
| JP | 02220973 A | * | 9/1990 |
| JP | 402293274 A | * | 12/1990 |

OTHER PUBLICATIONS

"Steering System and Steering Stability for Vehicles", first version by SANKAIDO Publishing on Sep. 10, 1996.
Japanese Patent Application No. Sho. 60 (1985) –44185.

* cited by examiner

Primary Examiner—Thomas G. Black
Assistant Examiner—Tuan C To
(74) Attorney, Agent, or Firm—Sughrue Mion, PLLC

(57) ABSTRACT

The present invention provides a rear-wheel steering angle control device which is capable of drastically reducing the man-hours required for setting a gain of a target rear-wheel steering angle relative to a front-wheel steering angle. The rear-wheel steering angle control device includes a target rear-wheel steering angle calculating device which has a variable coefficient inputting device. A specific parameter (such as steady $\beta$ gain) of a theoretical transfer function of physical quantity (such as vehicle-body slip angle $\beta$) relative to a front-wheel steering angle is multiplied with variable coefficients (such as $K\beta$) to a transfer function as a target transfer function (target $\beta$ transfer function 5).

1 Claim, 8 Drawing Sheets

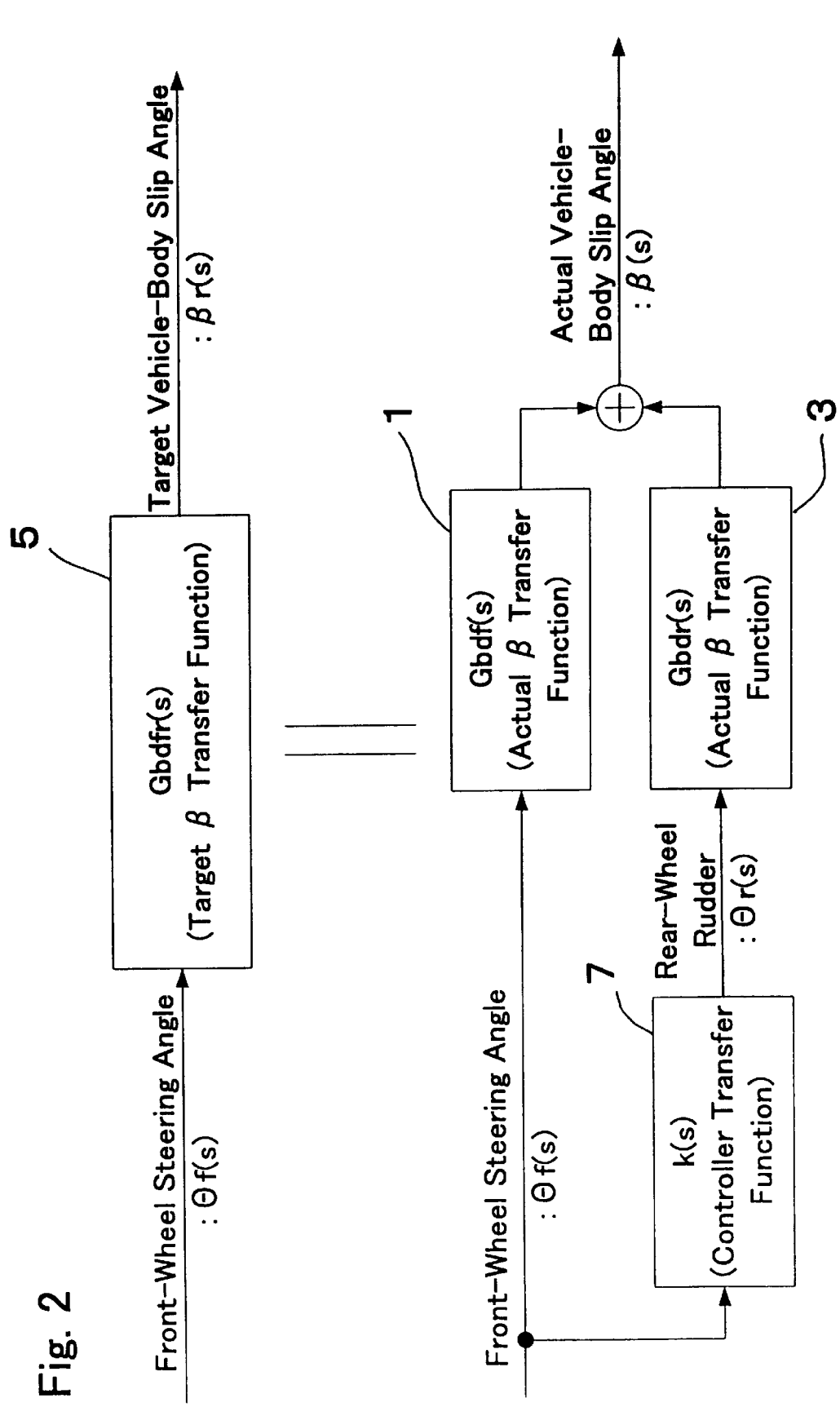

Fig. 3

$$Gbdf(s) = \frac{Grdf(0) \cdot (1+Tb \cdot s)}{(1+2\zeta/\omega n \cdot s+1/\omega n^2 \cdot s^2)} \quad \text{Formula(1)}$$

$$Gbdr(s) = \frac{Grdr(0) \cdot (1+Tb \cdot s)}{(1+2\zeta/\omega n \cdot s+1/\omega n^2 \cdot s^2)} \quad \text{Formula(2)}$$

Gbdf(0) = (Lr−Mv·Lf/(Cr·L)·v0²)/(L·(1+K·v0²))
Tb = Iz/(Cr·L)·v0/(Lr−Mv·Lf/(Cr·L)·v0²)
2ζ/ωn = ((Cf·Lf²·Cr·Lr2)·Mv+(Cf+Cr)·Iz)/(Cf·Cr·L²)·v0/(1+K·v0²)
ωn² = Iz·Mv/(Cf·Cr·L)·v0/(1+K·v0²)
Gbdr(0) = (Lf+Mv·Lr/(Cf·L)·v0/(Lf+Mv·Lr/(Cf·L)·v0²)
Tb' = Iz/(Cf·L)·v0/(Lf+Mv·Lr/(Cf·L)·v0²)

$$Gbdr(s) = \frac{K\beta \cdot Gbdf(0) \cdot (1+Tlc \cdot Tb \cdot s)}{(1+2Tc \cdot \zeta/(\omega n \cdot Wc) \cdot s+1/(\omega n \cdot Wc)^2 \cdot s^2)} \quad \text{Formula(3)}$$

k(s) = (n3·s³+n2·s²+n1·s+n0) / (d3·s³+d2·s²+d1·s+d0)   Formula(4)

n3 = Gbdf0/Gbdr0·(1/ωn²·Tb·(Kβ·Tlc−1/Wc²))
n2 = Gbdf0/Gbdr0·(2ζ/ωn·Tb·(Kβ·Tlc−Tc/Wc)+1/ωn²·(Kβ−1/Wc²))
n1 = Gbdf0/Gbdr0·(Tb·(Kβ·Tlc−1)+2ζ/ωn·(Kβ−Tc/Wc))
n0 = Gbdf0/Gbdr0·(Kβ−1)

| | |
|---|---|
| MV | : Vehicle-Body Mass (kg) |
| V0 | : Vehicle Speed (m/s) |
| Cf | : Front-wheel cornering Power |
| Cr | : Rear-wheel cornering Power |
| Lf | : Distance (m) between the center of gravity and Front-wheel ground point |
| Lr | : Distance (m) between the center of gravity and Rear-wheel ground point |
| Iz | : Yaw Inertia Moment ($kgm^2$ : Inertia Moment about the Center of Gravity) |
| L | : Wheel Base (m) |
| K | : Stability Factor ($s^2 / m^2$) |
| Kβ | : Steady β gain variable coefficient |
| Tlc | : Leading Item variable coefficient |
| Tc | : Damping Coefficient variable Coefficient |
| Wc | : Natural Frequency variable coefficient |

REAR-WHEEL STEERING ANGLE CONTROL DEVICE

FIELD OF THE INVENTION

The present invention is generally directed to a rear-wheel steer control device which steers rear wheels in addition to front wheels, depending on vehicle motion conditions, for improving vehicle stability and so on. More particularly, the present invention is directed to reduce man-hours required for setting a target rear-wheel steering angle of the device.

BACKGROUND OF THE INVENTION

It is well known that some vehicles possess a rear-wheel steering angle control device which steers rear wheels in addition to front wheels, depending on vehicle motion conditions, for improving vehicle stability and so on. In such a rear-wheel steer control device, a question is raised as to how to cope with setting an optimal target steering angle relative to a front steering angle depending on various vehicle motion conditions. To solve this question, a publication whose title is 'Steering System and Steering Stability for Vehicles' and which is published as the first version by SANKAIDO publishing on Sep. 10, 1996 provides an idea on page 196, titled '17.5.3 4WS control for zeroizing side skid' which says that while the vehicle-body slip angle (i.e. a deviation angle between the vehicle travel direction and the vehicle lengthwise direction) is focused, controlling the rear-wheel steering angle continually to reducing the vehicle slip angle to zero makes it possible to obtain an ideal vehicle dynamics with excellent vehicle stability.

However, conducting a road test according to the teaching of the aforementioned '4WS control for zeroizing side skid' reveals that the gain of the target rear-wheel steering angle relative to the front-wheel becomes too large, thereby giving an uncomfortable feeling to an ordinary driver. Thus, the aforementioned '4WS control for zeroizing side skid' is found not to be practical and therefore, the optimal gain of the target rear-wheel steering angle relative to the front-wheel steering angle is set in trial and error fashion based on various vehicle dynamics derived from road test results.

In addition, though Japanese Patent Publication No. Sho. 60 (1985)-44185 discloses a rear-wheel steering angle control device in which a gain of a target rear-wheel steering angle relative to a front-wheel steering angle is made variable depending on vehicle speed, this reference remains silent as to how to set the gain of the target rear-wheel steering angle relative to the front-wheel steering angle. This means that there is no change in requiring an extreme amount of man-hours in setting the gain.

Thus, a need exists to provide a rear-wheel steer control device which drastically reduces the man-hours required for setting a gain of a target rear-wheel steering angle relative to a front-wheel steering angle.

SUMMARY OF THE INVENTION

The present invention has been developed to satisfy the request noted above and a first aspect of the present invention provides a rear-wheel steer control device which comprises a detecting means for detecting at least a vehicle speed, an actual front-wheel steering angle, and an actual rear-wheel steering angle; a target rear-wheel steering angle calculating means for calculating a target rear-wheel steering angle based on at least outputs of the detecting means; and a rear-wheel steering angle controlling means for controlling the actual rear-wheel steering angle detected by the detecting means to become equal or approximately equal to the target rear-wheel steering angle calculated by the target rear-wheel steering angle calculating means. Further, the target rear-wheel steering angle calculating means includes a variable coefficient inputting means for inputting variable coefficients and an inverse operation setting means in which a specific physical quantity which represents a vehicle motion is dealt with when a transfer function of the rear-wheel steering angle relative to the front-wheel steering angle is set and as a target transfer function a transfer function is employed which is obtained by multiplying specific parameters of a theoretical transfer function of the specific physical quantity relative to the front-wheel steering angle by the variable coefficients inputted from the variable coefficient inputting means. When an equivalent transfer function of the specific physical quantity relative to the front-wheel steering angle is represented by a transfer function of the rear-wheel steering angle relative to the front-wheel steering angle, a theoretical transfer function of the specific physical quantity relative to the front-wheel steering angle, and a theoretical transfer function of the specific physical quantity relative to the rear-wheel steering angle, the transfer function of the rear-wheel steering angle relative to the front-wheel steering angle is inversely calculated so that the equivalent transfer function becomes equivalent to the target transfer function. Moreover, the target rear-wheel steering angle calculating means calculates the target rear-wheel steering angle based on the transfer function of the rear-wheel steering angle relative to the front-wheel steering angle as calculated by the inverse operation setting means.

In the preceding description, as the 'specific physical quantity which represents a vehicle motion', vehicle-body slip angle, yaw rate, or lateral acceleration, etc. is available. The 'theoretical transfer functions' are various theoretical formulas of transfer functions which are derived from 'control theory' when an adequate vehicle dynamics model is assumed. The 'specific characteristic parameter' of the theoretical transfer function is each of the various parameters which appear in the calculated theoretical transfer functions. An example of the 'specific characteristic parameter' related to static characteristic is the steady gain of a specified physical quantity, while examples of the 'specific characteristic parameter' related to dynamic characteristic are natural angular frequency, damping or attenuation ratio, leading item, and so on.

In accordance with the first aspect of the present invention, the target rear-wheel steering angle calculating means calculates the target rear-wheel steering angle based on the transfer function of the rear-wheel steering angle relative to the set front-wheel steering angle, in such a manner that the theoretical transfer function of the specific physical quantity relative to the front-wheel steering angle is derived, in order to obtain transfer functions as target transfer functions by multiplying the specific characteristic parameters which appear in the theoretical transfer function with various variable coefficient inputted from the variable coefficient inputting means. Further, the equivalent transfer function of the specific physical quantity, relative to the front-wheel steering angle, is represented by three transfer functions: the transfer function of the rear-wheel steering angle relative to the front-wheel steering angle, the theoretical transfer function of the physical quantity relative to the front-wheel steering angle, and the theoretical transfer function of the physical quantity relative to the rear-wheel steering angle. The transfer function of the rear-wheel steering angle relative to the front-wheel steering angle is set by the inverse operation setting means.

Thus, the set transfer function of the rear-wheel steering angle relative to the front-wheel steering angle is represented in a form which includes the various variable coefficients inputted from the variable coefficient inputting means to be multiplied with the specific parameter, which makes it possible, when each of the various variable coefficients is tuned, to tune the gain of the rear-wheel steering angle relative to front-wheel steering angle. It is to be noted that tuning each of the various variable coefficients brings in tuning each of the specific characteristic parameters which appear in the theoretical transfer function of the physical quantity relative to the front-wheel steering angle, thereby enabling to tune each of the characteristic parameters for satisfying the driver's feeling. Thus, when the gain of the rear-wheel steering angle relative to the front-wheel steering angle is tuned, the requirement is to tune only the various variable coefficients inputted from the variable coefficient inputting means while forecasting the change of vehicle dynamic characteristics due to changing each of the characteristic parameters, which makes it possible to remarkably reduce the man-hours required for setting the gain of the target rear-wheel steering angle relative to the front-wheel steering angle in trial and error fashion in road tests.

A second aspect of the present invention is to provide a rear-wheel steering angle control device to modify the structure of the first aspect, wherein the detecting means is capable of detecting a second specific physical quantity which represents the vehicle motion, and the target rear-wheel steering angle calculating means further includes a second specific physical quantity transfer function setting means in which a second specific physical quantity is dealt with and a transfer function of the second specific physical quantity relative to the front-wheel steering angle is calculated based on of the transfer function of the rear-wheel steering angle relative to the front-wheel steering angle which is calculated by the inverse operation setting means, a theoretical transfer function of the second specific physical quantity relative to the front-wheel steering angle and a theoretical transfer function of the second specific physical quantity relative to the rear-wheel steering angle, and a feedback control means for executing a feedback control in which a target second specific physical quantity calculated based on the transfer function of the second specific physical quantity relative to the front-wheel steering angle, which is calculated by the second specific physical quantity transfer function setting means, becomes equal to an actual second specific physical quantity which is detected by the detecting means, and wherein the target rear-wheel steering angle calculating means corrects the target rear-wheel steering angle by the feedback control means.

In the second aspect of the present invention, the second specific physical quantity, like the aforementioned specific physical quantity in the first aspect, can be in the form of vehicle-body slip angle, yaw rate, or lateral acceleration etc. The second specific physical quantity can be selected to be identical to the specific physical quantity.

Thus, correcting the target rear-wheel steering angle by providing the feedback control means makes it possible to set a much more precise target rear-wheel steering angle which is surely free from disturbances. In detail, the target second specific physical quantity, which is calculated based on the transfer function of the second specific physical quantity at the second specific physical quantity transfer function setting means, relative to the front-wheel steering angle is tuned by the various variable coefficients inputted from the variable coefficient inputting means and is input into the calculation which utilizes the transfer function of the rear-wheel steering angle, which is set at the inverse operation setting means, relative to the front-wheel steering angle. This second specific physical quantity is the target value which uses the second specific physical quantity for representing the expected vehicle dynamic characteristics resulting from tuning the various variable coefficients. On the other hand, the actual rear-wheel steering angle controlled by the rear-wheel steering angle control means to coincide with the target rear-wheel steering angle, which is calculated based on the transfer function of the rear-wheel steering angle relative to the front-wheel steering angle, may sometimes not coincide with the target rear-wheel steering angle due to disturbances. Such a difference causes the actual second specific physical quantity to change, which is detected by the detecting means. In addition, even if the actual rear-wheel steering angle is brought into coincidence with the target rear-wheel steering angle, the actual rear-wheel steering angle is not free from being changed due to disturbances. Thus, sometimes a deviation may appear between the target rear-wheel steering angle and the actual rear-wheel steering angle detected by the detecting means. However, providing the feedback control means for correcting the target rear-wheel steering angle to zero makes it possible to make a vehicle dynamic characteristic much closer to the expected vehicle dynamic characteristic, which is obtained when the various variable coefficients are tuned. Thus, setting a much more precise target rear-wheel steering angle is made possible. It is to be noted that as the second specific physical characteristic quantity employing one of yaw rate and lateral acceleration is preferable because real values are easy to detect using detecting means.

BRIEF DESCRIPTION OF THE DRAWINGS

The above and other objects, features and advantages of the present invention will be more apparent and more readily appreciated from the following detailed description of preferred exemplary embodiments of the present invention, taken in connection with the accompanying drawings, in which:

FIG. 2 illustrates a block diagram which acts as a basis for setting controller transfer function k(s) which is used in the rear-wheel steering control device in accordance with the embodiment of the present invention;

FIG. 3 represents theoretical formulas used for setting the controller transfer function;

FIG. 4 represents the meaning of each coefficient used in the theoretical formulas indicated in FIG. 3;

DETAILED DESCRIPTION OF THE PRESENT INVENTION

Hereinafter, a rear wheel steering angle control device in accordance with the an embodiment of the present invention will be described in detail with reference to the attached drawings.

Figure 1:
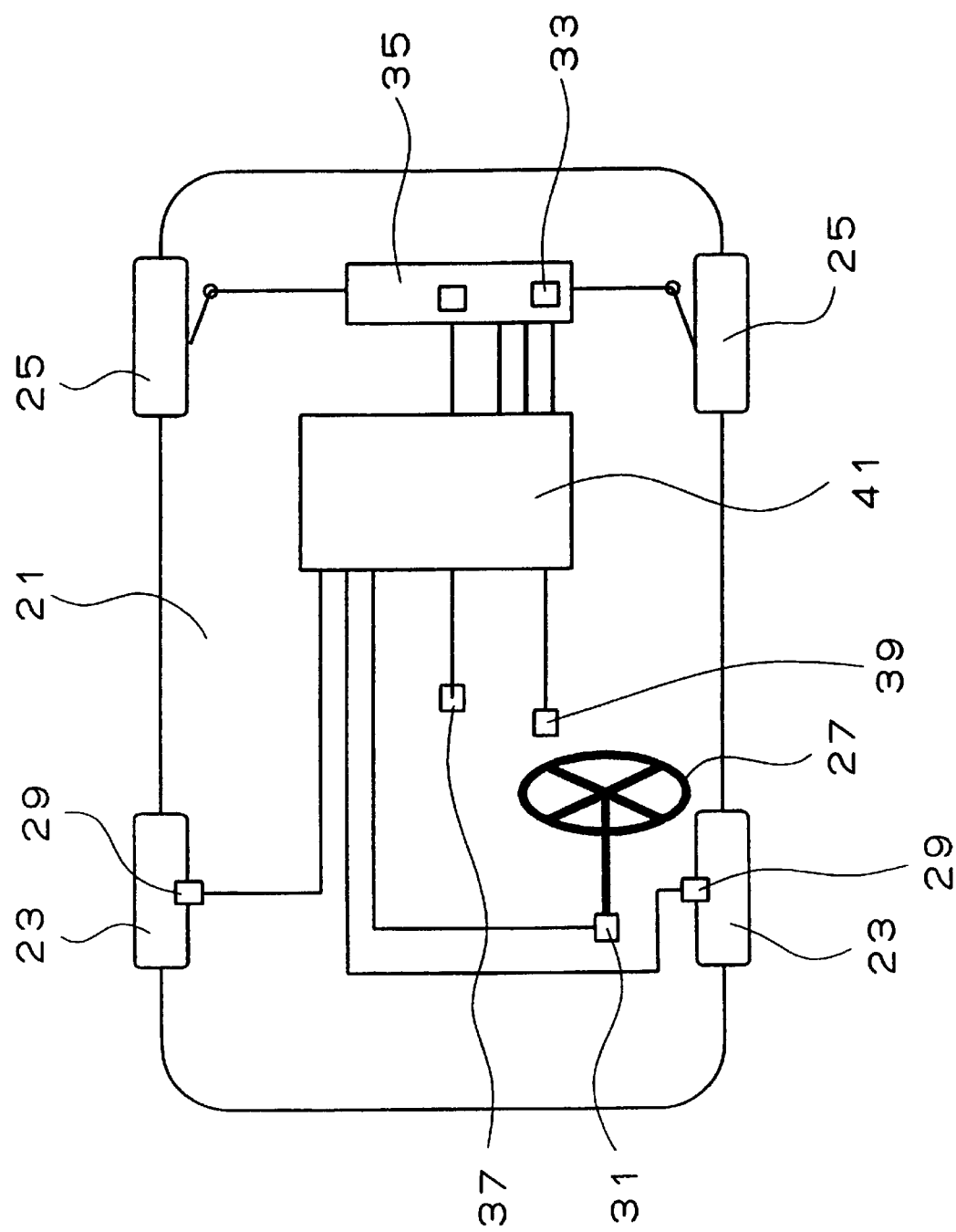
FIG. 1 illustrates a conceptual diagram of a 4WS vehicle which is mounted with a rear-wheel steering control device in accordance with an embodiment of the present invention.

First of all, referring to FIG. 1, there is illustrated a conceptual diagram of a 4WS vehicle 21 in which a rear-wheel steering control device is mounted in accordance with an embodiment of the present invention. The vehicle 21 includes a pair of front wheels 23 and 23 which are provided thereat with a pair of wheel speed sensors 29 and 29, respectively. Signals outputted from the respective wheel speed sensors 29 and 29 are used for representing or detecting the speed of the vehicle 21. A pair of rear wheels 25 and 25 are coupled to an actuator 35 for being steered thereby. The actuator 35 has a rear-wheel steering angle sensor 33. A steering wheel 27 is in association with a front-wheel steering angle sensor 31 so that when the steering wheel 27 is steered, the front-wheel steering angle sensor 31 determines the resultant steering angle of the front wheel 23. Output signals which are issued from the front-wheel steering angle sensor 31, the rear-wheel steering angle sensor 33, the wheel speed sensor 29, and a yaw rate sensor 37, receptively, are fed or inputted to a controller 41. The controller 41 calculates, on the based on these signals which are fed from the respective sensors, an optimal target rear-wheel steering angle and orders the actuator 35 to control the rear wheels 25 and 25 so that an actual rear-wheel steering angle is made identical with the target rear-wheel steering angle.

The wheel speed sensors 29 and 29, the rear-wheel steering angle sensor 33, the front-wheel steering angle sensor 31, and the yaw rate sensor 37 constitute a detecting means. The actuator 35 and the controller 41 constitute a rear-wheel steering angle control means. The controller 41 acts also as a target rear-wheel steering angle calculating means.

Hereinafter, a detailed explanation is made as to how the target rear-wheel steering angle is set in the rear-wheel steering angle control device.

Referring to FIG. 2, there is illustrated a block diagram which represents a basic concept for setting a controller transfer function k(s) as a transfer function of the rear wheel steering angle relative to the front wheel steering angle. As apparent from the illustration in FIG. 2, in the present embodiment, a vehicle body slip angle $\beta$ is employed as a specific physical quantity which represents a vehicular behavior or motion. The reason is that employing such a vehicle body slip angle $\beta$ makes it possible to tune each of characteristic parameters by the comparison relative to a reference or '4WS control for zeroizing side skid' which makes the driver feel odd. In the illustration, a front steering wheel angle is depicted instead of the front wheel steering angle. This is based on the fact that the present embodiment assumes 1:1 linear relationship between front-wheel steering angle and front steering wheel angle in ordinary vehicles. In addition, in the present embodiment, as a vehicle dynamic model used in calculation or analysis, for simplicity thereof, a so-called '2-Wheel Model' is employed.

In FIG. 2, a Gbdf(s) 1 represents an actual $\beta$ transfer function of an actual vehicle-body slip angle $\beta(s)$ relative to the front-wheel steering angle $\theta f(s)$ (i.e. theoretical transfer function of specific physical quantity relative to front-wheel steering angle). A Gbdr(s) 3 represents a real $\beta$ transfer function of an actual vehicle-body slip angle $\beta(s)$ relative to the rear-wheel steering angle $\theta r(s)$ (i.e. theoretical transfer function of specific physical quantity relative to rear-wheel steering angle). More specifically, the Gbdf(s) 1 and the Gbdr(s) 3 are given with formulas (1) and (2), respectively, as shown in FIG. 3, in the '2-Wheel Model'.

In FIG. 4, contents or meanings of the constants which appear in formula (1) and/or formula (2) are listed. In formula (1) and formula (2), symbols Gbdf(0), Tb, $\zeta$, $\omega n$, and Gbdr(0) represent a steady $\beta$ gain relative to $\theta f(s)$ in static characteristic, a leading term in dynamic characteristic, a damping coefficient in dynamic characteristic, a natural angular frequency in dynamic characteristic, and a steady $\beta$ gain relative to $\theta r(s)$ in static characteristic, respectively.

A Gbdfr(s) 5 represents a target $\beta$ transfer function (i.e. target transfer function) of a target vehicle-body slip angle $\beta r(s)$ relative to the front-wheel steering angle $\theta f(s)$. As apparent from formula (3) in FIG. 3, the Gbdfr(s) 5 can be formed by multiplying variable coefficients K$\beta$, Tlc, Tc, and Wc by the steady $\beta$ gain Gbdf(0) relative to $\theta f(s)$, the leading term Tb, the damping coefficient $\zeta$, and the natural angular frequency $\omega n$., receptively in formula (1). These variable coefficients K$\beta$, Tlc, Tc, and Wc can be fed to the controller from its outside or externally.

A k(s) 7 represents a controller transfer function (i.e. transfer function of rear-wheel steering angle relative to front-wheel steering angle) which gives a transfer function of rear-wheel steering angle $\theta r(s)$ relative to the front-wheel steering angle $\theta f(s)$. The controller 41, on the basis of this k(s) 7, calculates a target rear-wheel steering angle relative to the front-wheel steering angle. The controller calculates the k(s) 7 such that the representation of the k(s) 7 includes the variable coefficients K$\beta$, Tlc, Tc, and Wc as will be detailed hereunder.

In detail, as shown in FIG. 2, the transfer function of the target vehicle-body slip angle $\beta r(s)$ relative to the front-wheel steering angle $\theta f(s)$ is formulated at a target $\beta$ transfer function Gbdfr(s) 5, while the transfer function of the actual vehicle-body slip angle $\beta(s)$ relative to the front-wheel steering angle $\theta f(s)$ is formulated by summing and multiplying three transfer functions: the controller transfer function k(s) 7, the actual $\beta$ transfer function Gbdf(s), and the actual transfer function Gbdr(s). At this stage, the controller transfer function k(s) 7 is found or calculated by the inverse operation for making the target $\beta$ transfer function Gbdfr(s) 5 and is made equivalent with the equivalent transfer function. In detail, Gbdfr(s)=Gbdf(s)+k(s)·Gbdr(s) results in k(s)=(Gbdfr(s)−Gbdf(s))/Gbdr(s). Such a result is indicated by formula (3) depicted in FIG. 3. Thus, formulated or derived controller transfer function k(s) 7 is expressed in an equation which includes the variable coefficients K$\beta$, Tlc, Tc, and Wc. Inputting the variable coefficients K$\beta$, Tlc, Tc, and Wc externally to the controller 41 makes it possible to adjust or correct a gain of the rear-wheel steering angle relative to the front-wheel steering angle.

The controller transfer function k(s) 7 which is used in the controller 41 for calculating the target rear-wheel steering angle $\theta r(s)$ relative to the front-wheel steering angle $\theta f(s)$ is in the form of a 3rd order model as apparent from formula (4). Of course, it is possible to design the controller 41 based on a 3rd order model controller transfer function k(s) 7. However, in order to design the controller 41 for reducing cost in design, the controller transfer function k(s) is made in reduced-order model (i.e. model reduction) and is digitized or in discrete. Flow diagram of such a procedure is illustrated in FIG. 5.

Figure 5:
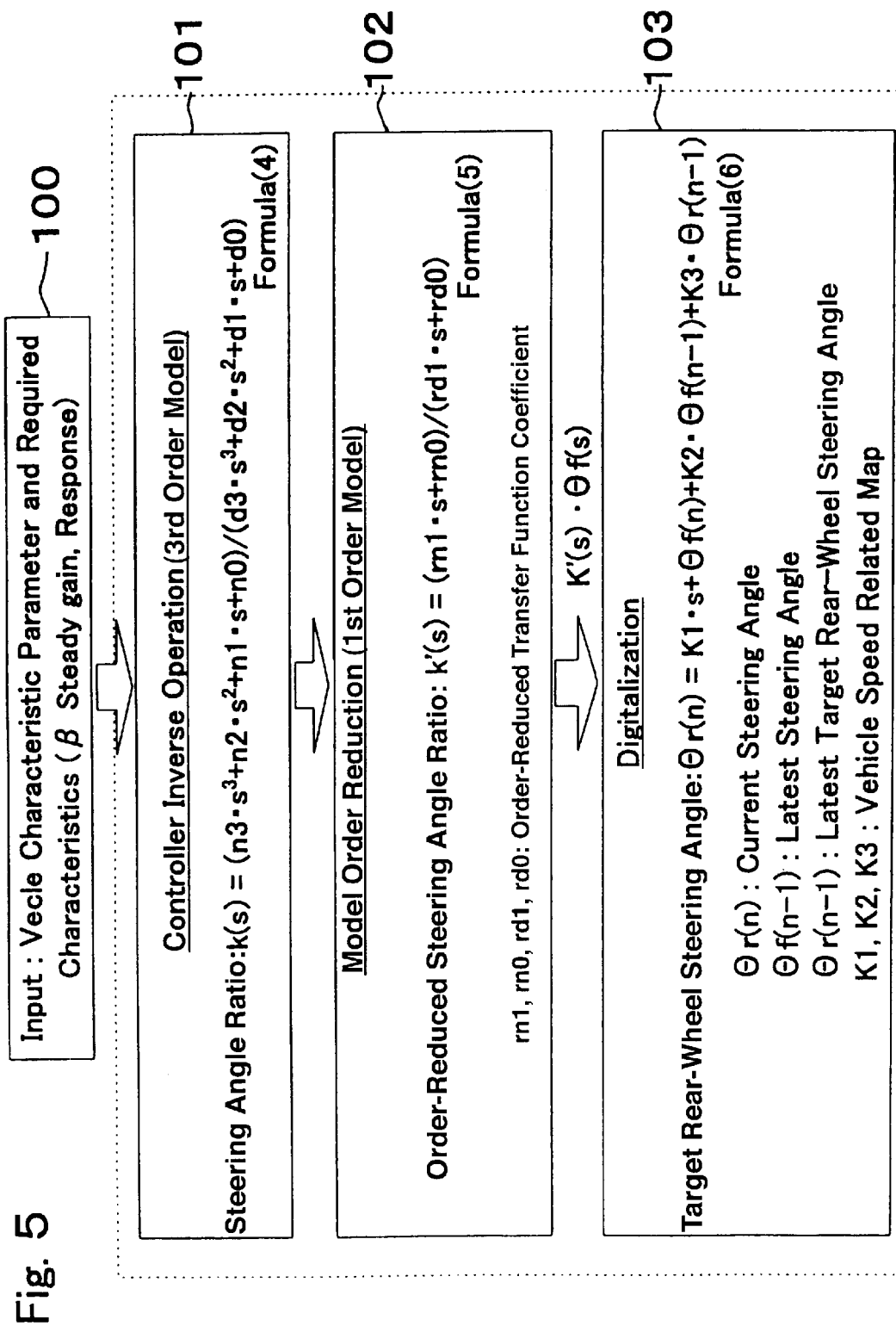
FIG. 5 illustrates a flow diagram which represents steps for designing the rear-wheel steering control device wherein the model order of k(s) is reduced and then k(s) is digitalized.

As shown in FIG. 5, first of all, at step 100, the variable coefficients Kβ, Tlc, Tc, and Wc are externally inputted to the controller 41. Next, at step 101, as explained above, the controller transfer function (i.e. steering angle ratio) k(s) is calculated as a 3rd order model. This controller transfer function (i.e. steering angle ratio) k(s) is transformed or converted into, by so-called 'approximate reducing order (i.e. model reduction) procedure' based on control theory, a first-order model K'(s) using reduced-order (i.e. model-reduced) transfer function coefficients, as indicated in formula (5). At step 103, the target rear-wheel steering angle θr(n) is found or calculated by multiplying this K'(s) by the front-wheel steering angle θf(s) and subsequent digitizing process. The target rear-wheel steering angle θr(n), as indicated in formula (6), is represented such that a currently detected front-wheel steering angle θf(n), a latest detected front-wheel steering angle θf(n−1), and a latest target rear-wheel steering angle θr(n−1) are multiplied by coefficients K1, K2, and K3, respectively. Each of the coefficients K1, K2, and K3 is represented in a map which is related to the vehicle speed detected by the sensor.

Figure 6:
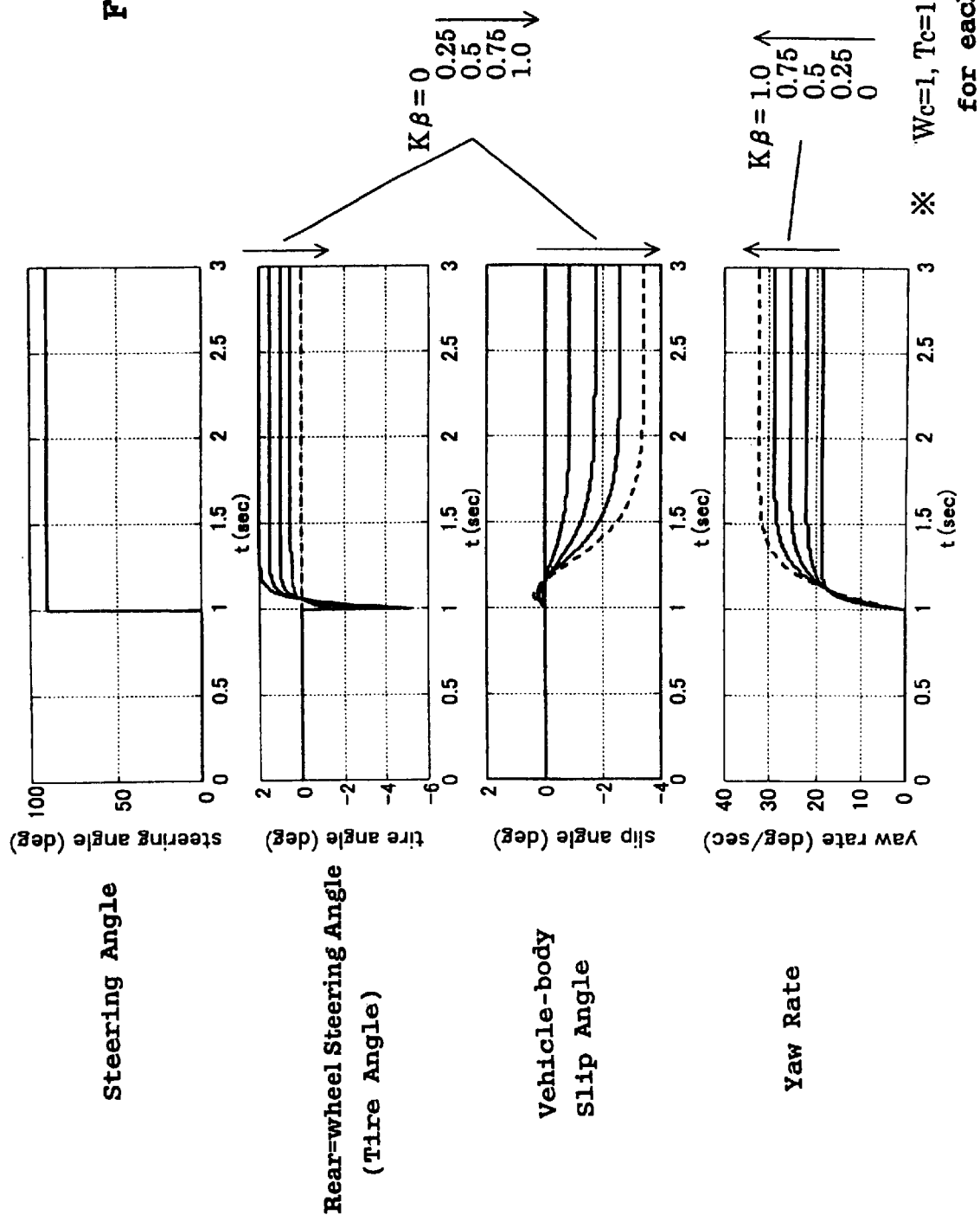
FIG. 6 indicates graphs each of which represents how each vehicle-motion-representing physical quantity reacts in time series in such manner that dynamic characteristic related to a characteristic parameter is fixed, while static characteristic related to a characteristic parameter is varied.
Figure 7:
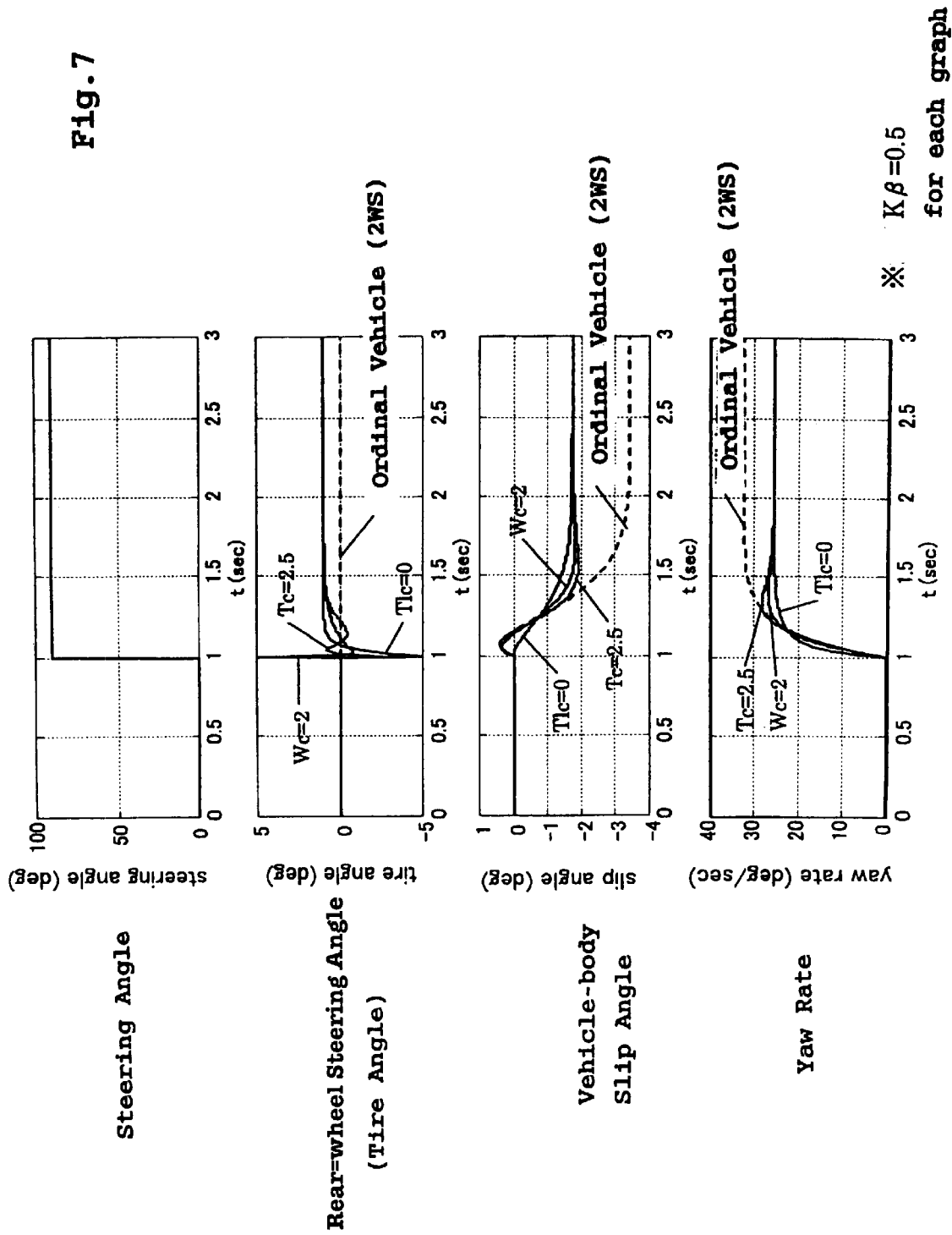
FIG. 7 indicates graphs, each of which represent how each vehicle-motion-representing physical quantity reacts in time series in such a manner that static characteristic related characteristic parameter is fixed, while dynamic characteristic related characteristic parameter is varied.

FIGS. 6 and 7 indicate numerical examples as to how each vehicle-motion-representing physical quantity (i.e. each of the rear-wheel steering angle, the vehicle-body slip angle, and the yaw rate) reacts if the variable coefficients Kβ, Tlc, Tc, and Wc are varied while the front-wheel steering angle is varied from its neutral position through 90 degrees in a stepwise fashion. The calculation is performed in such manner that the target rear-wheel steering angle is found and the resultant value is substituted into a theoretical formula derived from control theory which is to be applied to the 2-Wheel Model.

FIG. 6 represents how each of the rear-wheel steering angle, the vehicle-body slip angle, and the yaw rate changes when the variable coefficient Kβ of the steady β gain Gbdf(0) as static characteristic related characteristic is changed from 0 to 1 in increments of 0.25 degrees while each Tlc, Tc, and Wc is made 1 which are the variable coefficients of the respective the leading term Tb, the damping coefficient ζ, and the natural angular frequency ωn (which are also respective dynamic characteristic related characteristics). The dot line indicates a result when Kβ=1. In FIG. 6, when Kβ is increased from 0 to 1 in increments of 0.25, it can be revealed that the steady value of the rear-wheel steering angle approaches zeros, the steady value (i.e. the absolute value) of the vehicle-body slip angle increased from zero gradually, and the steady value of the yaw rate is also increased gradually. It is to be noted that letting Kβ=1 and Kβ=0 correspond to the previously mentioned '4WS control for zeroizing side skid' and so-called '2WS condition' which continually makes the target rear-wheel steering angle zero. This tendency can be understood from the results illustrated in FIG. 6. That is, when Kβ=0, the steady value of the vehicle-body slip angle is zero, by which doing '4WS control for zeroizing side skid' can be understood, while, when Kβ=1, the steady value of the rear-wheel steering angle is made zeros, by which 2WS condition can be recognized.

FIG. 7 represents how each of the rear-wheel steering angle, the vehicle-body slip angle, and the yaw rate changes when each of Tlc, Tc, and Wc is changed in variety. Tlc, Tc, and Wc are the variable coefficients of the respective the leading term Tb, the damping coefficient ζ, and the natural angular frequency ωn which are also respective dynamic characteristic related characteristics while the variable coefficient Kβ of the steady β gain Gbdf(0) as static characteristic related characteristic is fixed to 0.5. The dotted line indicates a result when Kβ=Tlc=Tc=Wc=1 which indicates 2WS. Considering, for example, the vehicle-body slip angle with reference to FIG. 7, it can be understood that when Wc=2 which means that the natural angular frequency ωn is doubled or when Tc=2 which the damping coefficient ζ is increased by a factor of 2.5 times, at much earlier stage, a steadier condition is attained than when the vehicle-body slip angle establishes the 2WS condition.

As described above, tuning each of the variable coefficients means that the vehicular characteristic parameters are tuned independently and relative to each other, which makes it possible to tune each of the characteristic parameters, with considering the physical meaning of each of the characteristic parameters considered, so as to fit the driver's feeling. Thus, for turning the rear-wheel steering angle gain relative to the front-wheel steering angle, while forecasting the change of vehicle motion characteristic resulting from the change of each of the characteristic parameters, only tuning each of the variable coefficients is required which is inputted from the variable coefficient input means. Therefore, the man-hours required for setting the target rear-wheel steering angle gain relative to the front-wheel steering angle by road tests in try and error fashion can be drastically reduced.

Figure 8:
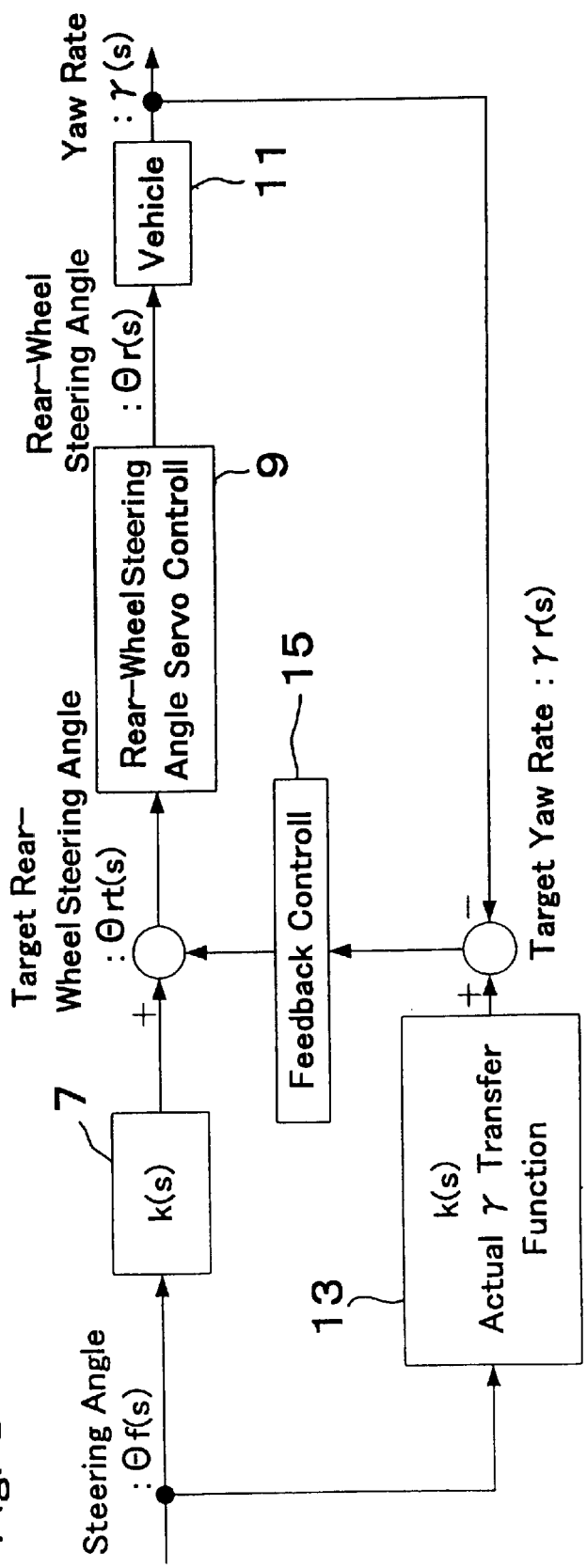
FIG. 8 illustrates a control block diagram when the controller is provided with a feedback control loop.

Referring to FIG. 8, there is illustrated a control block diagram where the controller 41 is provided with a feedback control means. In FIG. 8, when the steering angle θf(s) is inputted to the controller 41, the controller 41, which acts as a target rear-wheel steering angle calculating means, calculates a target rear-wheel steering angle θrt(s) by using the aforementioned controller transmit function k(s). The resultant target rear-wheel steering angle θrt(s) is fed to a rear-wheel steering angle servo control section 9 of the controller 41. The controller 41, which acts as a rear-wheel steering angle control means, does a servo control for making the actual rear-wheel steering angle identical with the target rear-wheel steering angle θrt(s). The resultant or servo-controlled rear-wheel steering angle θr(s) is inputted into each rear-wheel of a real vehicle 11. A yaw rate γ(s) which is produced during vehicle motion is determined or detected as a second actual physical quantity by the yaw rate sensor 37.

On the other hand, a k(s) actual γ transfer function 13 as a second particular physical quantity transfer function is calculated by the sum of and the multiple of the following items (such a calculation corresponds to the equivalent transfer function):

the controller transfer function k(s) 7,
a theoretical transfer function of yaw rate relative to the steering angle which is given by a theoretical 2W-model control formula (i.e. theoretical transfer function of the second particular physical quantity relative to the front-wheel steering angle), and a theoretical transfer function of the yaw rate relative to the rear-wheel steering angle which is given by a theoretical 2W-model control formula (i.e. theoretical transfer function of the second particular physical quantity relative to the rear-wheel steering angle).

In detail, such a calculation is made by using formula (7). The target yaw rate γr(s) as the target second particular physical quantity, which is calculated by the k(s) actual γ transfer function 13, is compared to the aforementioned yaw rate γ(s) as the second actual particular physical quantity and a difference therebetween is fed to a feedback control 15. In this feedback control 15, the difference between the target yaw rate γr(s) and the yaw rate γ(s) is multiplied with a predetermined proportional gain to calculate a corrected target rear-wheel steering angle. The resultant or calculated corrected target rear-wheel steering angle is brought into correction so as to make the difference between the target yaw rate $\gamma r(s)$ and the yaw rate $\gamma(s)$ zero.

As mentioned above, correcting the target rear-wheel steering angle $\theta rt(s)$ by employing or providing the feedback control means makes it possible to set a more precise target rear-wheel steering angle, which is free from disturbances. In detail, under the condition in which the actual rear-wheel steering angle always in coincides with the target rear-wheel steering angle and which is free from disturbances, such as cross wind or change of road-surface $\mu$ (frictional coefficient), the actual yaw rate $\gamma(s)$ detected on the actual vehicle should completely coincide with the target yaw rate $\gamma r(s)$ in theory. However, sometimes the actual yaw rate $\gamma(s)$ may not coincide with the target yaw rate $\gamma r(s)$. The resultant difference causes the yaw rate $\gamma(s)$ to change. In addition, even if the actual rear-wheel steering angle can be controlled perfectly to coincide with the target rear-wheel steering angle, the yaw rate $\gamma(s)$ may vary due to disturbances and so on. Thus, sometimes a difference may be generated between the target yaw rate $\gamma r(s)$ and the yaw rate $\gamma(s)$ detected in the actual vehicle. However, providing the aforementioned feedback control 15 to correct the target rear-wheel steering angle $\theta rt(s)$ such that the difference between the target yaw rate $\gamma r(s)$ and the test road detected yaw rate $\gamma(s)$ is reduced to zero makes it possible, despite disturbances and so on, to obtain a vehicle dynamics which is much closer to an expected vehicle dynamics resulting from tuning the variable coefficients, resulting in that a much more precise target rear-wheel steering angle can be set. It is to be noted that as the second specific physical quantity employing the yaw rate is not restrictive which is easy to detect its real value by detecting means such as sensors. Instead, the lateral acceleration is available. If possible, as the second specific physical quantity, the vehicle-body slip angle can be used which is used for setting the controller transfer function.

As explained above in great detail, the present invention makes it possible to provide a rear-wheel steering angle control device in which the man-hours for setting a gain of a target rear-wheel steering angle relative to the front-wheel steering angle can be reduced.

The invention has thus been shown and description with reference to specific embodiments, however, it should be understood that the invention is in no way limited to the details of the illustrates structures but changes and modifications may be made without departing from the scope of the appended claims.

What is claimed is:

1. A rear-wheel steering angle control device comprising:
   a detecting means for detecting at least a vehicle speed, an actual front-wheel steering angle, and an actual rear-wheel steering angle;
   a target rear-wheel steering angle calculating means for calculating a target rear-wheel steering angle on the basis of at least outputs of the detecting means; and
   a rear-wheel steering angle controlling means for controlling the actual rear-wheel steering angle detected by the detecting means to become equal or approximately equal to the target rear-wheel steering angle calculated by the target rear-wheel steering angle calculating means,
   wherein the target rear-wheel steering angle calculating means includes a variable coefficient inputting means for inputting variable coefficients and an inverse operation setting means in which:
   a specific physical quantity which represents a vehicle motion is dealt with when a transfer function of the rear-wheel steering angle relative to the front-wheel steering angle is set and
   as a target transfer function is employed which is obtained by multiplying specific parameters of a theoretical transfer function of the specific physical quantity relative to the front-wheel steering angle by the variable coefficients inputted from the variable coefficient inputting means and
   when an equivalent transfer function of the specific physical quantity relative to the front-wheel steering angle is represented by a transfer function of the rear-wheel steering angle relative to the front-wheel steering angle, a theoretical transfer function of the specific physical quantity relative to the front-wheel steering angle, and a theoretical transfer function of the specific physical quantity relative to the rear-wheel steering angle, the transfer function of the rear-wheel steering angle relative to the front-wheel steering angle is inversely calculated so that the equivalent transfer function becomes equivalent to the target transfer function,
   wherein the target rear-wheel steering angle calculating means calculates the target rear-wheel steering angle based on the transfer function of the rear-wheel steering angle relative to the front-wheel steering angle calculated by the inverse operation setting means;
   wherein the detecting means is capable of detecting a second specific physical quantity which represents the vehicle motion;
   wherein the target rear-wheel steering angle calculating means further includes:
   a second specific physical quantity transfer function setting means in which:
   a second specific physical quantity is dealt with and a transfer function of the second specific physical quantity relative to the front-wheel steering angle is calculated based on the transfer function of the rear-wheel steering angle relative to the front-wheel steering angle which is calculated by the inverse operation setting means, a theoretical transfer function of the second specific physical quantity relative to the front-wheel steering angle and a theoretical transfer function of the second specific physical quantity relative to the rear-wheel steering angle, and
   a feedback control means for executing a feedback control in which a target second specific physical quantity calculated based on the transfer function of the second specific physical quantity relative to the front-wheel steering angle which is calculated by the second specific physical quantity transfer function setting means becomes equal to an actual second specific physical quantity which is detected by the detecting means; and
   wherein the target rear-wheel steering angle calculating means corrects the target rear-wheel steering angle by the feedback control means.

* * * * *